March 4, 1958 — H. E. DIECKMANN — 2,825,180
BIRD CALL
Filed Oct. 7, 1955

Herbert E. Dieckmann
INVENTOR.

BY *Clarence A. O'Brien*
*and Harvey B. Jackson*
Attorneys

United States Patent Office 2,825,180
Patented Mar. 4, 1958

2,825,180

BIRD CALL

Herbert E. Dieckmann, Vandalia, Ill.

Application October 7, 1955, Serial No. 539,214

1 Claim. (Cl. 46—180)

This invention generally relates to novel and useful improvements in bird calls.

An object of the present invention is to provide a bird call constructed in a manner to be adjustable in order to vary the pitch of the call for calling different birds, and also adjustable to produce different pitches to suit the individual user.

A further object of the present invention is to provide a bird call in accordance with the preceding object in which the vibrating reed is removably mounted therein wherein the reed may be replaced or interchanged with other reeds and tongues, thereby permitting the same bird call to be utilized for calling various types of birds.

Other objects of the present invention will reside in its simplicity of construction, ease of operation, ease of adjustment, effectiveness in operation and its relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
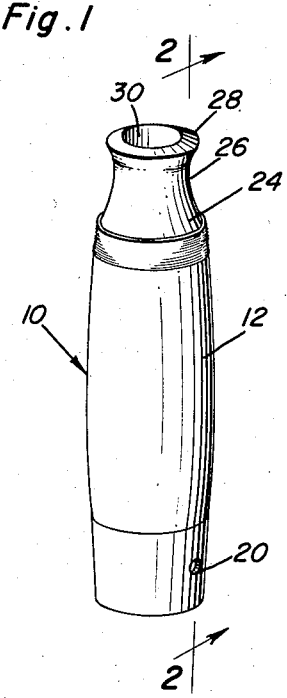
Figure 1 is a perspective view of the bird call of the present invention.
Figure 2:
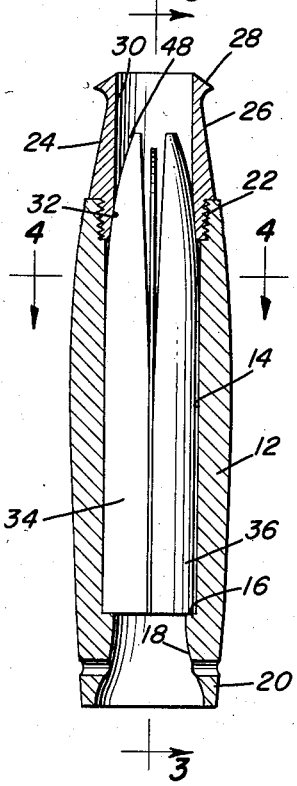
Figure 2 is a longitudinal, vertical sectional view taken substantially upon the plane of section line 2—2 of Figure 1 illustrating the construction of the bird call.
Figure 3:
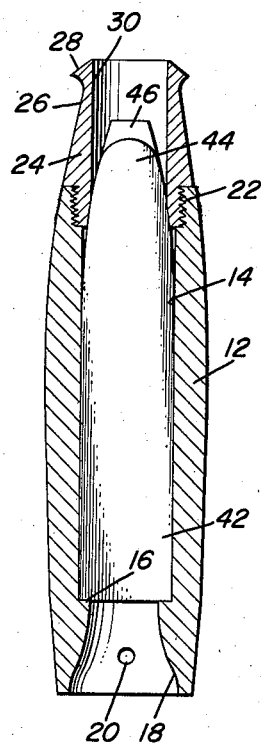
Figure 3 is a longitudinal, vertical sectional view taken substantially upon a plane passing along section line 3—3 of Figure 2 illustrating further structural details of the bird call.
Figure 5:
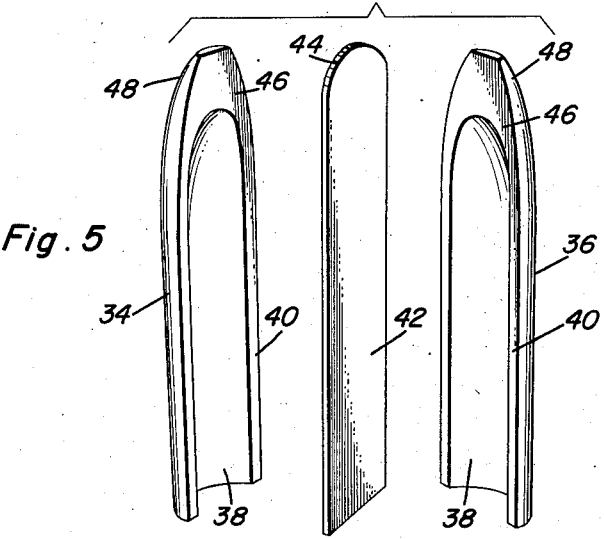
Figure 5 is an exploded perspective view illustrating the construction and the relationship of the pair of semicylindrical tongues together with the reed disposed therebetween.
Figure 4:
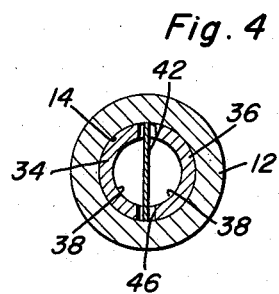
Figure 4 is a transverse, plan sectional view taken substantially upon a plane passing along section line 4—4 of Figure 2 illustrating the relationship of the semicylindrical tongues to the reed positioned therebetween.

With reference to the accompanying drawings, the numeral 10 generally designates the bird call of the present invention including a generally cylindrical tubular housing 12 having a longitudinal bore 14 extending therethrough which is of substantially constant cross-sectional area. At one end of the housing 12, an inwardly extending peripheral shoulder 16 is formed which forms an abutment adjacent one end of the bore 14. Exteriorly of the shoulder 16, the bore 14 is provided with an inner surface 18 which diverges from the diameter of the shoulder 16 to a larger diameter at the outer end thereof. A transverse bore or aperture 20 is disposed between the outer end of the diverging wall 18 and the shoulder 16 and is in communication with the longitudinal bore 14 and the apertures 20 extend at diametrically opposed points for receiving a supporting cord, wire or the like. The outer surface of the housing 12 may be slightly larger in diameter at the center than at the ends, thereby forming an easily handled bird call 10.

The other end of the housing 12 is provided with an internally threaded portion 22 for receiving a mouthpiece 24 having a concave outer peripheral surface 26 terminating in a peripherally projecting lip 28 for easy positioning and retaining in the mouth of a person using the bird call. The mouthpiece 24 is provided with a longitudinal bore 30 generally coextensive with the longitudinal bore 14 in the housing 12 and the inner end of the bore 30 is provided with a slightly diverging inner surface 32.

A pair of generally semicylindrical tongues 34 and 36 are disposed within the longitudinal bore 14 with the outer end thereof engaging and abutting the shoulder 16. The tongues 34 and 36 are provided with longitudinal grooves 38 in the facing surfaces thereof which extend substantially throughout the entire length thereof, thereby forming longitudinal facing edges 40 which clamp and engage an elongated reed 42 having a rounded inner end 44. The edges 40 adjacent the inner end of the tongues 34 and 36 are diverging, as indicated by the numeral 46. Also, these diverging edges 46 form the inner closed end of the longitudinal grooves 38, and the inner end of the reed 42 is disposed between the diverging edges 46, thereby permitting vibration of the reed 42 and especially the rounded end portion 44 thereof.

The outer surface of each of the tongues 34 and 36 adjacent the inner end thereof curves inwardly, as designated by the numeral 48 for engagement with the surface 32 of the mouthpiece 24, thereby permitting the diverging edges 46 to be adjusted in clamping relation to the reed 42, by tightening or loosening the mouthpiece thereby varying the vibration characteristics of the reed 42 and varying the pitch of the sound made by the bird call 10 for adapting the bird call 10 for calling various birds.

Inasmuch as the mouthpiece 24 is removable and the tongues 34 and 36 may be easily removed from the housing 12, the reed 42 may be exchanged for another type of reed having different vibration characteristics, thereby permitting the bird call 10 to be utilized for calling various types of birds, wherein a different reed may be employed for providing the most natural type of call for attracting similar birds in a most efficient manner. The device may be constructed of any suitable material lending itself to ease of manufacture and inexpensive production costs.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A bird call comprising an elongated tubular housing having a longitudinal bore extending therethrough, an interior peripheral shoulder on said housing adjacent one end of the bore, a mouthpiece screw-threadedly engaged with the other end of said housing, said mouthpiece having a longitudinal bore extending therethrough of less cross-sectional area than the bore through the housing and forming a continuation thereof, the inner end of said mouthpiece defining an internal peripheral shoulder in spaced relation to the shoulder on said housing, a pair of semi-cylindrical members disposed within the housing and having one end abutting the shoulder in the housing, the other end of each semi-cylindrical member having converging inner and outer surfaces projecting into the mouthpiece with the outer surface forming a cam surface for engagement by the shoulder defined by the inner end of the mouthpiece whereby the screw-threaded connection between the mouthpiece and housing will cause longitudinal movement of the mouthpiece upon relative rotation between the housing and mouthpiece thereby varying the space between the inner surfaces of the semi-cylindrical members, the inner surfaces of said semi-cylindrical members being provided with a longitudinal groove with the portion thereof projecting into the mouthpiece being transversely continuous with the divergency of these continuous surfaces providing an air passage from the mouthpiece to the passage defined by the facing grooves in the semi-cylindrical members, an elongated reed clamped between the facing edges of the semi-cylindrical members, the inner end of the reed being disposed between the diverging inner surfaces of the semi-cylindrical members for permitting vibration of the reed, the variation in spacing between the inner surfaces of the semi-cylindrical members causing variation in the vibration frequency of the reed by varying the clamping action between the semi-cylindrical members and the reed.

References Cited in the file of this patent
UNITED STATES PATENTS

| | | |
|---|---|---|
| 813,353 | Brunner | Feb. 27, 1906 |
| 1,043,123 | McCluskey | Nov. 5, 1912 |
| 2,116,183 | Beach | May 3, 1938 |
| 2,321,193 | Garrison | June 8, 1943 |
| 2,604,731 | Meucci | July 29, 1952 |
| 2,729,025 | Jones | Jan. 3, 1956 |